Patented Apr. 9, 1940

2,196,395

UNITED STATES PATENT OFFICE 2,196,395

PROCESS OF CANDY COATING CEREAL PRODUCT AND THE LIKE

John L. Kellogg, Chicago, Ill., assignor, by mesne assignments, to Helen L. Kellogg, Chicago, Ill.

No Drawing. Application March 30, 1938, Serial No. 198,855

9 Claims. (Cl. 99—134)

This invention relates to the coating of bodies of vegetable origin, in the production of confections of the type of confection consisting of a cereal base and candy coating; the invention relating more particularly to the coating of puffed or partially puffed cereals such as puffed rice, puffed corn, puffed wheat, corn flakes, popped corn and the like, with candy or sugar containing compounds. The principal object of the invention is to provide a new candy coating process, intended more especially for fragile vegetable bodies such as puffed cereals, whereby the coating may be effected without breaking of the cereal bodies treated—an important consideration when the coating is to be applied to delicate and fragile bodies such as puffed or flaked cereals—and whereby the product will have improved flavor, crispness and better keeping qualities.

Heretofore in coating, or attempting to coat bodies of this sort with sugar containing compounds, it has been customary, in order to give the coating brittleness and dryness, to cook the compound at relatively high temperatures, say 290°–295° F. for the purpose of driving off most of the water content of the coating, that is, the water used to dissolve the sugar. This makes a syrup which readily dries to a hard, brittle coating that is not excessively sticky; but with such concentrated syrup it is impossible, or at least very difficult, to coat fragile and delicate bodies such as flaked or puffed cereals without excessive breakage of the puffed or flaked grains.

In order to overcome this difficulty the cereal product, according to the present invention, is coated with a liquid compound containing an excess of water so that the compound is thin enough to be readily mixed with and to coat the cereal bodies without breaking them; and after the coating operation is completed the coated product is heated, in an oven, for example, to dry out the excess moisture and thus harden and make crisp and brittle the coatings which, without this treatment, would be soft and sticky. Preferably the heating is carried to a point which toasts the puffed cereal bodies. As a result of this method of procedure the product, besides consisting of unbroken puffed or flaked kernels, is crisper, has better keeping qualities and also has better flavor than if coated according to previously known practices. A coating compound containing the required excess water may be obtained either by cooking the ingredients of the compound, principally sugars, water, and fat, at lower temperatures than is customary, for example at about 225°–230° F., or at temperatures even below this; or the coating compound may be cooked at the usual higher temperatures, for example at 290°–295° F., or higher, and then diluted with water before being used for coating the cereal. The first method is preferred as it appears to give a better flavor to the product. In either case the syrup is sufficiently concentrated before application to the cereal bodies as to prevent the cereal bodies from becoming soggy.

The following is a specific example of the application of the invention to practice. It will be understood that this example is purely illustrative and informative, and that the invention is not to be considered as limited to the particular ingredients and operating data given therein; the intention being to cover all equivalents and all modifications of the process within the scope of the appended claims.

Example.—To nine and one-half pounds of cane sugar is added one pint of water, and the sugar and water placed over a low fire until the sugar is melted or dissolved. To the syrup thus formed are added two and three-quarters pounds of molasses and two and three-quarters pounds of glucose (corn syrup) of the usual commercial densities. The ingredients are brought to a boil and there is added to the mix one pound of fat, animal or vegetable, preferably cocoanut oil or butter. The mix is cooked at a temperature of about 225°–230° F. It may be flavored in any suitable manner, for example, by adding twelve ounces of salt. Preferably to give the compound lightness one-half ounce of baking soda is added.

Twelve pounds of puffed corn or puffed rice is put into a rotary mixer and the syrup compound, made as aforesaid, is poured over it. The cereal and syrup are mixed together until the cereal bodies are thoroughly and evenly coated with the coating compound which can be readily done because of the thinness of the syrup. The coated material is then placed in an oven, preferably in a cylindrical screen rotating in an oven, and baked until the coating is dry and hard. Preferably the heat applied is sufficient to toast the cereal as well as drive off the moisture from the material. To accomplish this result the material may be baked in an oven at 350°–450° F. for about 10–15 minutes.

The term "puffed cereals," is intended to include cereals such as corn, rice, wheat, and the like, whether explosively puffed by the gun method or popped in the ordinary popping machine at atmospheric pressure, or partially puffed by the oven method as in the case of flaked cereals such as corn flakes.

I claim:

1. Process of producing candy coated puffed cereals which comprises: preparing a liquid coating compound by cooking together, at a temperature not substantially higher than 230° F. sugar, water and a fat; gently mixing together the puffed cereal and the coating compound; and thereafter baking the material until the coating on each separate puffed cereal body is dry and hard.

2. Process of producing candy coated puffed cereals which comprises: cooking at a temperature not substantially higher than 230° F., sugar, water, molasses, glucose, and a fat to form a liquid coating compound; mixing together the separate cereal bodies and the compound; and thereafter baking the product until the coating on each individual cereal body is dry and hard.

3. Process of producing candy coated puffed cereals which comprises: cooking, at a temperature not substantially higher than 230° F., sugar, water, molasses, glucose, and a fat to form a liquid coating compound; mixing together the puffed cereal bodies and said compound and thereafter, while keeping the individual puffed cereal bodies in motion, baking the product to evaporate water from the coating and to toast the cereal bodies.

4. Process of producing candy coated puffed cereals which comprises: dissolving nine and one-half pounds of cane sugar in one pint of water, and adding to the syrup two and three-quarters pounds of molasses and two and three-quarters pounds of glucose; bringing the material to a boil and adding one pound of cocoanut oil and cooking to a temperature of 225°–230° F.; mixing with the coating compound thus formed the puffed cereal bodies to be coated; and then baking the material in an oven at a temperature of about 350°–450° F. for about 10–15 minutes.

5. Method of treating a mass of separate and fragile cereal food bodies to provide each body with a substantially non-sticky sugar coating which comprises gently mixing said bodies with the sugar coating compound in a liquid state and containing an excess of water, said sugar coating compound being sufficiently concentrated before application to the cereal bodies to prevent the cereal bodies from becoming soggy and then, while maintaining the bodies in motion to provide uniform exposure and to inhibit the tendency of the individual bodies to adhere to one another, heating the mass to evaporate excess water from the individual coating.

6. Process for the production of a confection which comprises: mixing fragile vegetable bodies with a sugar and water syrup thin enough so that the vegetable bodies may be individually and evenly coated with the syrup without fracture of said bodies, said syrup being sufficiently concentrated before application to said bodies to prevent said bodies from becoming soggy; and thereafter heating the said coated bodies so as to evaporate water from the coatings.

7. Process for the production of a confection which comprises: mixing fragile vegetable bodies with a sugar and water syrup thin enough so that the vegetable bodies may be individually and evenly coated with the syrup without fracture of said bodies, said syrup being sufficiently concentrated before application to said bodies to prevent said bodies from becoming soggy; and thereafter heating the said coated bodies so as to evaporate water from the coatings and bring about the toasting of the vegetable bodies.

8. Process for the production of a confection which comprises: mixing puffed cereal bodies with a sugar and water syrup thin enough so that said puffed bodies may be individually and evenly coated with the syrup without fracture of said bodies, said syrup being sufficiently concentrated before application to said bodies to prevent said bodies from becoming soggy; and thereafter heating said coated bodies so as to evaporate water from the coatings.

9. Process for the production of a confection which comprises: mixing puffed cereal bodies with a sugar and water syrup thin enough so that said puffed bodies may be individually and evenly coated with the syrup without fracture of said bodies, said syrup being sufficiently concentrated before application to said bodies to prevent said bodies from becoming soggy; and thereafter heating said coated bodies so as to evaporate water from the coatings and bring about the toasting of the vegetable bodies.

JOHN L. KELLOGG.